(12) United States Patent
Chang et al.

(10) Patent No.: US 10,639,791 B2
(45) Date of Patent: May 5, 2020

(54) DYNAMIC LASER TOUCH-SENSING WITH MULTIPLE ROBOT DYNAMIC USER FRAME

(71) Applicant: FANUC AMERICA CORPORATION, Rochester Hills, MI (US)

(72) Inventors: Tien L. Chang, Troy, MI (US); Terry Tupper, Grand Blanc, MI (US); Ho Cheung Wong, Troy, MI (US); Sai-Kai Cheng, Rochester Hills, MI (US); Jason Tsai, Bloomfield Hills, MI (US)

(73) Assignee: FANUC CORPORATION, Rochester Hills, MI (US)

( * ) Notice: Subject to any disclaimer, the term of this patent is extended or adjusted under 35 U.S.C. 154(b) by 208 days.

(21) Appl. No.: 15/613,984

(22) Filed: Jun. 5, 2017

(65) Prior Publication Data
US 2017/0348853 A1 Dec. 7, 2017

Related U.S. Application Data

(60) Provisional application No. 62/345,221, filed on Jun. 3, 2016.

(51) Int. Cl.
*B25J 9/16* (2006.01)
*G05B 19/401* (2006.01)
*G05B 19/042* (2006.01)

(52) U.S. Cl.
CPC ............ *B25J 9/163* (2013.01); *G05B 19/042* (2013.01); *G05B 19/401* (2013.01); *G05B 2219/40099* (2013.01); *G05B 2219/40581* (2013.01); *G05B 2219/45138* (2013.01)

(58) Field of Classification Search
CPC ...... B25J 9/163; G05B 19/042; G05B 19/401; G05B 2219/40099; G05B 2219/40581; G05B 2219/45138
See application file for complete search history.

(56) References Cited

U.S. PATENT DOCUMENTS 5,999,642 A * 12/1999 Gilliland .............. B23K 9/1274
 348/90
6,205,636 B1 * 3/2001 Abe ..................... G05B 19/401
 29/407.1

(Continued)

*Primary Examiner* — Nicholas Kiswanto
(74) *Attorney, Agent, or Firm* — John A. Miller; Shumaker, Loop & Kendrick, LLP

(57) ABSTRACT

Methods and systems for touch-sensing to provide an updated user frame are provided. These include the provision of a user frame and the touch-sensing of a workpiece, where the touch-sensing includes performing a touch-sensing schedule. The touch-sensing schedule includes one of a laser touch-sensing event and a wire touch-sensing event, where one of the laser touch-sensing event and the wire touch-sensing event is switched to the other of the laser touch-sensing event and the wire touch-sensing event while performing the touch-sensing schedule. An offset of the workpiece relative to the user frame is determined based on the touch-sensing of the workpiece and the offset is applied to the user frame to provide the updated user frame. The unique dynamic user frame feature enables same touch sensing program to be cloned and applied on multiple robot controllers.

24 Claims, 2 Drawing Sheets

(56) References Cited

U.S. PATENT DOCUMENTS

| | | | | |
|---|---|---|---|---|
| 6,243,621 B1 * | 6/2001 | Tao | ............... | B25J 9/1694 |
| | | | | 219/124.34 |
| 6,452,134 B2 | 9/2002 | Hong | | |
| 6,812,665 B2 * | 11/2004 | Gan | ............... | B25J 9/1692 |
| | | | | 318/568.11 |

* cited by examiner

DYNAMIC LASER TOUCH-SENSING WITH MULTIPLE ROBOT DYNAMIC USER FRAME

CROSS-REFERENCE TO RELATED APPLICATIONS

This application claims the benefit of U.S. Provisional Application No. 62/345,221, filed on Jun. 3, 2016. The entire disclosure of the above application is incorporated herein by reference.

FIELD

The present technology relates to touch-sensing using a robot to update a user frame, including laser touch-sensing and dynamically switching between laser touch-sensing and wire touch-sensing or vice versa, where a dynamic user frame feature provides a unique mechanism to transfer touch-sensing coordinated motion teach pendant programs among multiple robot controllers.

INTRODUCTION

This section provides background information related to the present disclosure which is not necessarily prior art.

U.S. Pat. No. 6,452,134 B2 to Hong, titled "Method for Correcting Teaching Points for Welding Robot and Welding Robot System Employing the Same," discloses a method for correcting a preset locus of a teaching point for a welding robot having a touch sensor. The method includes the steps of positioning a workpiece on a welding jig, performing a touch-sensor tracking for the workpiece relative to reference coordinate axes, calculating a displacement of the workpiece through the touch-sensor tracking, and obtaining a new locus of the teaching point based on a transformation matrix generated on the basis of the displacement. With these steps, the teaching points are correctly updated by a touch sensor tracking without an additional equipment for optional sensor tracking, such as laser sensors and arc sensors. This type of method can present certain issues, however. For example, such a method does not support dynamic switching between wire touch-sensing and laser sensor touch-sensing. The method further lacks support for simultaneous laser touch-sensing using one or more robots. Another issue is that such a method does not support laser touch-sensing using multiple robots and a dynamic user frame. It would be advantageous to develop methods and systems that attend to these issues and optimize dynamic laser touch-sensing using multiple robots with a dynamic user frame.

SUMMARY

The present technology includes systems, processes, and articles of manufacture that relate to dynamic touch-sensing with one or more robots, the touch-sensing including laser touch-sensing and/or wire touch-sensing, including switching between laser touch-sensing and wire touch-sensing, in order to dynamically update a user frame. When the dynamic user frame features is enable, touch-sensing teach pendant programs including both touch search motion and touch offset calculation can be transferred among multiple robot controllers easily with minimal touchup, if any.

Methods for touch-sensing to provide an updated user frame include the following aspects. A user frame is provided, where the user frame can define one or more workpiece positions. Touch-sensing of a workpiece is performed, for example, by using a robot having a robot arm, where the robot arm includes a laser touch sensor. The touch-sensing of the workpiece can therefore include a laser touch-sensing event. An offset of the workpiece relative to the user frame is determined based on the touch-sensing of the workpiece. The offset is applied to the user frame to provide the updated user frame. In this way, for example, the method can account for the offset or a change in displacement or dimensions between a workpiece or successive workpieces relative to an original user frame. Accuracy of subsequent operations or tool actions by one or more robots can therefore be optimized relative to the workpiece position and/or dimensions.

Touch-sensing of the workpiece can include using a robot having a robot arm with both a laser touch sensor and a wire touch sensor and/or the touch-sensing can include using more than one robot, where the robots each have a laser touch sensor, a wire touch sensor, or both. Touch-sensing the workpiece can also include simultaneously performing a laser touch-sensing event and a wire touch-sensing. A plurality of touch-sensing events can be used in touch-sensing the workpiece, where multiple touch-sensing events are performed by one or more robots. The plurality of touch-sensing events can also include switching from a laser touch-sensing event to a wire touch-sensing event and vice versa. Touch-sensing the workpiece can include the use of a leader robot where the updated user frame is then provided to a follower robot. In this way, operations or tool actions by one or more follower robots can be optimized relative to the workpiece position and/or dimensions.

Touch-sensing to provide an updated user frame can also include the following aspects. Provision is made for a user frame. Touch-sensing a workpiece occurs, where the touch-sensing embodies the performance of a touch-sensing schedule that includes one of a laser touch-sensing event and a wire touch-sensing event. One of the laser touch-sensing event and the wire touch-sensing event is switched to the other of the laser touch-sensing event and the wire touch-sensing event while performing the touch-sensing schedule. In this manner, for example, the touch-sensing can be dynamically updated between laser and/or wire touch-sensing events. An offset of the workpiece relative to the user frame is determined based on the touch-sensing of the workpiece so that the offset can be applied to the user frame to provide the updated user frame.

The present technology accordingly supports dynamic switching back and forth between laser touch-sensing and wire touch-sensing. Switching to/from laser touch-sensing from/to wire touch-sensing can occur one or more times. For example, in a robot teach pendant program, a user can switch dynamically between wire touch-sensing and laser sensor touch-sensing via different touch-sensing schedules. Switching can also include switching from laser touch-sensing or wire touch-sensing to simultaneous laser and wire touch-sensing or vice versa. The selection of a touch-sensing event type in each touch-sensing schedule can therefore be configured as a wire touch-sensing event, laser touch-sensing event, or both wire and laser touch-sensing events. During program execution, the system can accordingly switch dynamically between one or more wire touch-sensing events and one or more laser touch-sensing events based on a predetermined touch-sensing schedule or a dynamically updated touch-sensing schedule. Multiple robots can be used in touch-sensing a workpiece in successive or simultaneous laser touch-sensing events. For example, multiple robots can be configured in a single touch-sensing schedule using wire touch-sensing events, laser touch-sensing events, or both wire and laser touch-sensing events. All robots configured in the touch-sensing schedule can also execute optimized operations or tool actions relative to the workpiece position and/or dimensions based on the updated user frame to which the offset is applied.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
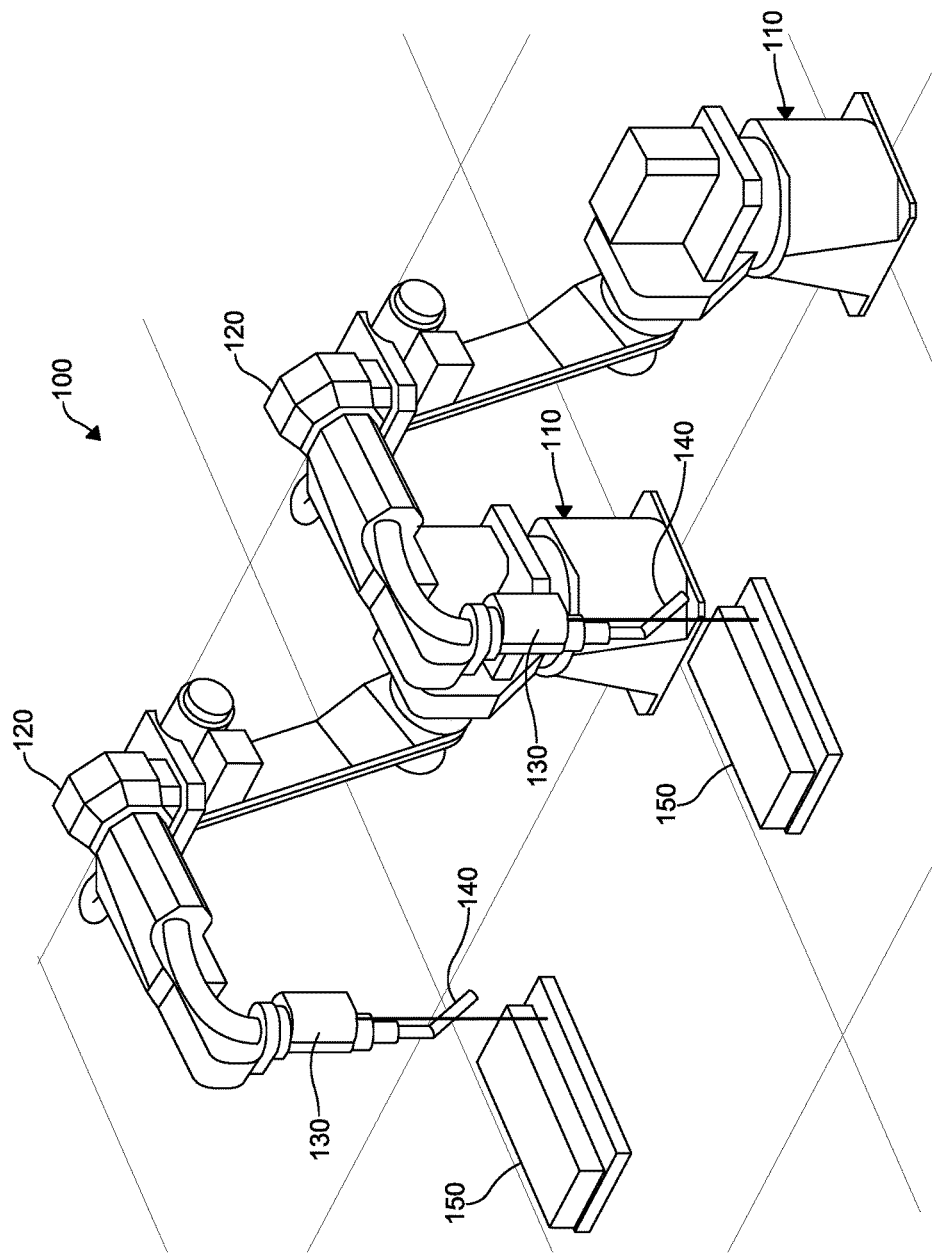
FIG. 1 illustrates an embodiment of a two robots, each robot having a robot arm with a laser touch sensor and a wire touch sensor.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

The present technology provides various ways of touch-sensing to provide an updated user frame. In this regard, a user frame is provided and a workpiece is touch sensed. The touch-sensing of the workpiece includes a laser touch-sensing event where an offset of the workpiece relative to the user frame is determined therefrom. The offset is then applied to the user frame to provide the updated user frame. Dynamic switching between wire touch-sensing and laser sensor touch-sensing is therefore possible. For example, in a robot teach pendant program, a user can switch dynamically between wire touch-sensing and laser touch-sensing via different touch-sensing schedules. One or more touch-sensing events in each touch-sensing schedule can be configured as a wire touch-sensing event, a laser touch-sensing event, or both a wire and laser touch-sensing event. During program execution, the system can switch dynamically between wire touch-sensing and/or laser touch-sensing based on the touch schedule configurations.

The user frame can define a workpiece and workpiece environment. For example, the user frame can be the result of teaching one or more robots the location of a workpiece for one or more operations or tool actions by the robot(s). A single touch-sensing event or a series of touch-sensing events can be used to define or modify the user frame and can be used to check the position and/or dimensions of a workpiece or a subsequent workpiece prior to initiating one or more operations or tool actions by the robot(s) on the workpiece. The series of touch-sensing events can be part of a touch-sensing schedule, for example. Touch-sensing events can hence determine an offset of the workpiece relative to the user frame based on the touch-sensing of the workpiece and can therefore apply the offset to the user frame to provide the updated user frame. The updated user frame, for example, can include new origin and/or axis information based on the touch-sensing of the workpiece. In this manner, the touch-sensing can be dynamically adjusted while performing and acquiring touch-sensing events to optimize the provision of the updated user frame.

One or more robots can be used in various sequential or simultaneous laser touch-sensing events. One or more robots can also be configured in a single touch schedule using only laser touch-sensing. One or more robots can be configured in the touch-sensing schedule to execute simultaneous wire touch-sensing and laser touch-sensing events. The present technology can therefore support multiple robot laser touch-sensing with a dynamic user frame. Examples of robots and touch-sensing include those described in U.S. Pat. No. 6,243,621 B1 to Tao et al., titled "Method of determining workpiece positions including coordinated motion."

When a dynamic user frame is enabled, the touch search motion used by laser sensor touch-sensing is relative to the dynamic user frame, and the dynamic user frame is updated for a laser touch-sensing offset calculation. For example, the present technology can modify the methods and apparatus provided in U.S. Pat. No. 6,452,134 B2 to Hong (hereinafter "Hong"), titled "Method for Correcting Teaching Points for Welding Robot and Welding Robot System Employing the Same," where one or more wire touch-sensing events as described therein are dynamically switched with one or more laser touch-sensing events or simultaneous wire and laser touch-sensing events using the present technology. As described by Hong, a workpiece can be mounted to a welding jig. The workpiece and welding jig can be within a user frame, as described herein. Where Hong establishes a preset locus of at least one teaching point between an initial welding point and a terminating welding point, the present technology provides the user frame including the definition of the teaching point between the initial welding point and the terminating welding point. Where Hong sets at least one detection point defined as a preset locus at the workpiece, the present technology can include a user frame having the preset locus defined therein. Touch-sensing the detection point at the workpiece in Hong can then include touch-sensing the workpiece, as per the present technology, where the touch-sensing includes a laser touch-sensing event. This accordingly identifies a sensed locus of the detection point detected by the touch-sensing and generates a transformation matrix based on a difference between the preset locus of the detection point and the sensed locus of the detection point. The present technology likewise determines an offset of the workpiece relative to the user frame based on the touch-sensing of the workpiece. Hong obtains a new locus of the teaching point based on the transformation matrix, and in a similar fashion, the present technology applies the offset to the user frame to provide the updated user frame. When the dynamic user frame feature is enabled, a touch search frame can be relative to a leader frame, therefore the same touch search motion program can be transferred to one or more robot controllers and applied with the updated or new user frame which includes an updated leader frame.

Another method for touch-sensing to provide an updated user frame includes providing a user frame and touch-sensing a workpiece, where the touch-sensing includes at least one laser touch-sensing event. An offset of the workpiece relative to the user frame is determined based on the touch-sensing of the workpiece. Applying the offset to the user frame allows the user frame to be updated to provide the updated user frame. It should be noted that the touch-sensing of the workpiece can include a touch-sensing schedule including a plurality of touch-sensing events, where the touch-sensing schedule includes one of a laser touch-sensing event and a wire touch-sensing event. The one of the laser touch-sensing event and the wire touch-sensing event is switched to the other of the laser touch-sensing event and the wire touch-sensing event. More than one switch can occur and a user can dynamically switch between touch-sensing types or include simultaneous wire and laser touch-sensing events in determining the offset of the workpiece relative to the user frame. When the dynamic user frame feature is enabled, touch offset is calculated relative to the dynamic user frame including the leader frame, therefore the same touch offset program can be transferred to one or more other robot controllers and applied with the updated or new user frame.

Touch-sensing of one or more workpieces can include using one or more robots, where at least one robot has a robot arm including both a laser touch sensor and a wire touch sensor. Touch-sensing the one or more workpieces can include performing a laser touch-sensing event and/or a wire touch-sensing event using the robot, including simultaneously performing laser and wire touch-sensing events. Touch-sensing the workpiece can include a plurality of touch-sensing events and the plurality of touch-sensing events can include a plurality of laser touch-sensing events. The plurality of touch-sensing events can be performed by a single robot, where the single robot can have a robot arm including a laser touch sensor and a wire touch sensor. The plurality of touch-sensing events can also be performed by a plurality of robots where at least one robot has a robot arm, the robot arm including a laser touch sensor and a wire touch sensor. The plurality of touch-sensing events can include switching from one of the laser touch-sensing event and the wire touch-sensing event to the other of the laser touch-sensing event and the wire touch-sensing event. The plurality of touch-sensing events can include a plurality of laser touch-sensing events and a plurality of wire touch-sensing events, which can be performed by a single robot or a plurality of robots. The plurality of touch-sensing events can comprise a touch-sensing schedule. The touch-sensing schedule can include a wire touch-sensing event and the wire touch-sensing event can be switched with the laser touch-sensing event. For example, a plurality of laser touch-sensing events can be switched to a plurality of wire touch-sensing events, plurality of wire touch-sensing events can be switched to a plurality of laser touch-sensing events, or both can occur. Touch-sensing the workpiece can include using a leader robot, where the updated user frame is provided to a follower robot. One example of a leader robot and follower robot system is provided in U.S. Pat. No. 7,211,978 B2 to Chang et al.

Another method for touch-sensing to provide an updated user frame includes providing a user frame and touch-sensing a workpiece. Touch-sensing the workpiece includes performing a touch-sensing schedule having one of a laser touch-sensing event and a wire touch-sensing event. The one of the laser touch-sensing event and the wire touch-sensing event is then switched to the other of the laser touch-sensing event and the wire touch-sensing event while performing the touch-sensing schedule. An offset of the workpiece relative to the user frame is determined based on the touch-sensing of the workpiece. The offset is then applied to the user frame to provide the updated user frame.

As recognized by one skilled in the art in view of the present disclosure, the various methods described herein can be implemented by various systems, devices, and apparatus configurations capable of performing the requisite tasks. In particular, various systems and apparatus configurations can be used in dynamic switching between wire touch-sensing and laser sensor touch-sensing for robots. Systems and apparatus configurations can accordingly support dynamic switching between wire touch-sensing and laser touch-sensing in a robot, where a touch-sensing schedule of the system can be configured with one of a wire touch-sensing event and a laser touch-sensing event. During program execution, the system can be dynamically switched to the other of the wire touch-sensing event and the laser touch-sensing event.

Other systems and apparatus configurations can include those supporting multiple robot simultaneous laser touch-sensing events. Multiple robots can accordingly be configured in a single touch schedule that employs at least one laser touch-sensing event. At least one of the robots configured in the schedule includes both a wire touch sensor and a laser touch sensor and is operable to execute both a wire touch-sensing event and a laser touch-sensing event. The multiple robots can include a leader robot and a follower robot, where the leader robot, either alone or in conjunction with one or more additional robots, determines the offset of the workpiece as described herein. The updated user frame obtained from application of the offset to the user frame allows the follower robot, either alone or in conjunction with one or more additional robots, to perform an operation using the updated user frame; e.g., tool actions by the follower robot relative to the workpiece position and/or dimensions.

An embodiment of a system 100 or apparatus configuration of the present technology is shown in FIG. 1. In particular, the system 100 includes two robots 110, where each robot 110 has a robot arm 120 with a laser touch sensor 130 and a wire touch sensor 140. Other robots (not shown) can be included, where each robot can include a laser touch sensor and/or a wire touch sensor. As shown, the two robots 110 are each operating on a separate workpiece 150; however, it is understood that both robots 110 can operate on the same workpiece 150. A user frame can be associated with one or both workpieces 150. For example, the workpieces 150 can be substantially identical, as shown, or one can have a change in position and/or dimension relative to the user frame or relative to the other workpiece 150, or the workpieces 150 can have entirely different configurations with respect to each other. At least one of the robots 110 can touch-sense the workpiece 150, where the touch-sensing can include performing a touch-sensing schedule. The touch-sensing schedule can include one of a laser touch-sensing event and a wire touch-sensing event. A user can dynamically alter the system while one or both of the robots 110 performs the touch-sensing schedule to switch the one of the laser touch-sensing event and the wire touch-sensing event to the other of the laser touch-sensing event and the wire touch-sensing event. For example, while a first robot 110 performs a first wire touch-sensing event as part of the touch-sensing schedule, a second robot 110 can be switched to perform a laser touch-sensing event in place of a second wire touch-sensing event, as the first robot 110 may be operating in a space that is less than optimal for the second robot 110 to perform the second wire touch-sensing event in a timely fashion. The dynamic switching can therefore optimize the necessary touch-sensing of the workpiece 150 to more efficiently determine an offset of the workpiece 150 relative to the user frame and allow application of the offset to the user frame to provide the updated user frame. The robots 110 can also be configured as leader and follower robots, as described.

Figure 2:
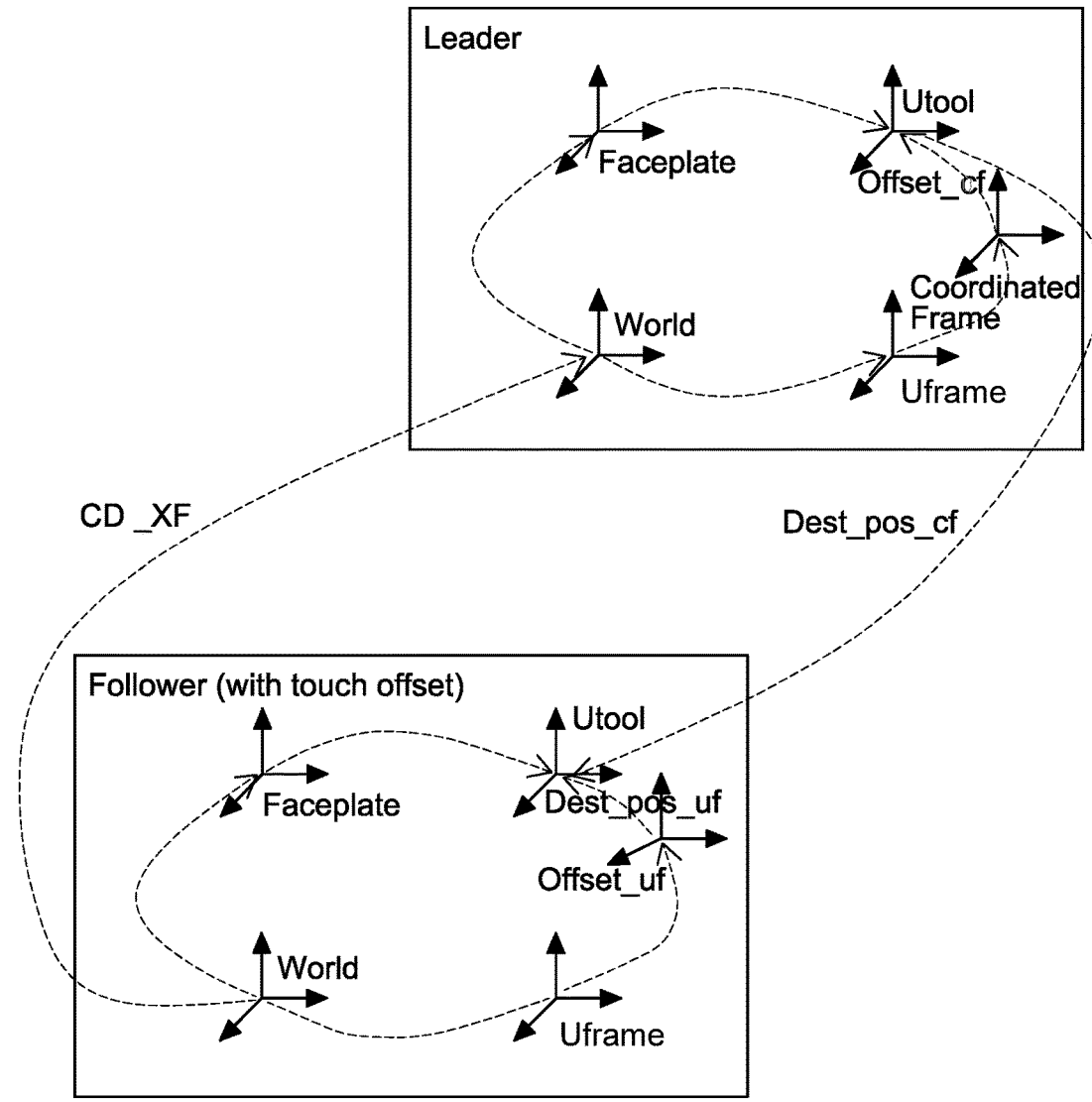
FIG. 2 illustrates an embodiment of a leader robot providing a updated user frame to a follower robot, optimizing the accuracy of one or more subsequent operations or tool actions by the follower robot relative to the workpiece position and/or dimensions.

With reference to FIG. 2, an embodiment of a leader robot providing a updated user frame to a follower robot is shown. The accuracy of one or more subsequent operations or tool actions by the follower robot relative to the workpiece position and/or dimensions is thereby optimized. The following aspects and abbreviations are applied and depicted in the figure.

A touch frame can be defined as:
Touch_Ldr_Frame=INV(CD_XF:Ldr_TCP:Inv_Ldr_Utool: Ldr_Frame):3Pt_Frame where
Touch_Frame: Touch frame relative to the leader TCP position.
Touch_Ldr_Frame: Touch frame relative to the leader frame position.
3Pt_Frame: Frame created via 3 point method.
CD_XF: CD transformation from the follower base to the leader base.
Ldr_TCP: Leader TCP position.
Inv_Ldr_Utool: Inverse transformation of Leader Utool.
Ldr_Frame: Leader Frame.

A touch-sensing search motion can be defined as:
Search_Frame=(CD_XF:Ldr_TCP:Inv_Ldr_Utool: Ldr_Frame):Touch_Ldr_Frame An example of a touch offset calculation can include the following parameters as depicted in the figure:

UF_flw:Offset_uf:Dest_pos_uf=CD_XF:UF_ldr: Pos_ldr_uf:Offset_cf:Dest_pos_cf
UF_flw: Uframe of the follower.
Dest_pos_uf: destination position of the follower w.r.t. the follower uframe.
CD_XF1: CD transformation from the follower 1 base to the leader base.
UF_ldr: Uframe of the leader.
Pos_ldr_uf: position of leader w.r.t. the leader uframe.
Dest_pos_cf: destination position of the follower w.r.t. the coordinated frame.
Offset_uf: the offset transformation w.r.t. the uframe of the follower.
Offset_cf: the offset transformation w.r.t. the coordinated frame.
Offset_of=inv(UF_flw):CD_XF1:UF_ldr:Pos_ldr_uf:Offset_cf:inv(CD_XF1: UF_ldr:Pos_ldr_uf):UF_flw The follower uframe can be updated with the offset to provide a correct dynamic uframe, where:
Dyn_Uframe=CD_XF:Ldr_TCP:Inv_Ldr_Utool: Ldr_Frame The present technology provides advantages on single robot and multi-robot systems, as it creates a unique mechanism to support multiple touch-sensing events in an optimized manner. Other laser touch-sensing methods and systems do not support simultaneous touch-sensing using multiple robots and do not support coordinated motion and dynamic switching between different types touch-sensing events. The present technology accordingly can support both wire touch-sensing events and laser touch-sensing events on a single robot arm or multiple robot arms. In particular, laser touch-sensing events can include using multiple robots, where one or more robots perform simultaneous wire touch-sensing and laser touch-sensing events using one or more robot arms. For example, a single robot arm can have both a laser touch sensor and a wire touch sensor. Alternatively, coordinated motion between multiple robots can perform multiple touch-sensing events and the user can switch between event types to optimize a touch-sensing schedule. Dynamic switching and updating of a user frame is hence possible. The present technology can be implemented such that it can be compatible with existing functionality including single robot touch-sensing and existing multi-robot touch-sensing.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:
1. A method for touch-sensing to provide an updated user frame, the method comprising:
providing a user frame;
touch-sensing a workpiece, the touch-sensing including a laser touch-sensing event, where touch-sensing the workpiece includes using a robot having a robot arm, the robot arm including a laser touch sensor and a wire touch sensor;

determining an offset of the workpiece relative to the user frame based on the touch-sensing of the workpiece; and applying the offset to the user frame to provide the updated user frame.

2. The method of claim 1, wherein touch-sensing the workpiece includes simultaneously performing the laser touch-sensing event and a wire touch-sensing event using the robot.

3. The method of claim 1, wherein touch-sensing the workpiece includes a plurality of touch-sensing events.

4. The method of claim 3, wherein the plurality of touch-sensing events includes a plurality of laser touch-sensing events.

5. The method of claim 3, wherein the plurality of touch-sensing events is performed by a single robot.

6. The method of claim 5, wherein the single robot has a robot arm, the robot arm including a laser touch sensor and a wire touch sensor.

7. The method of claim 3, wherein the plurality of touch-sensing events is performed by a plurality of robots.

8. The method of claim 7, wherein at least one robot has a robot arm, the robot arm including a laser touch sensor and a wire touch sensor.

9. The method of claim 3, wherein the plurality of touch-sensing events includes switching from one of the laser touch-sensing event and a wire touch-sensing event to the other of the laser touch-sensing event and the wire touch-sensing event.

10. The method of claim 9, wherein the plurality of touch-sensing events includes a plurality of laser touch-sensing events and a plurality of wire touch-sensing events.

11. The method of claim 9, wherein the plurality of touch-sensing events is performed by a single robot.

12. The method of claim 11, wherein the single robot has a robot arm, the robot arm including a laser touch sensor and a wire touch sensor.

13. The method of claim 9, wherein the plurality of touch-sensing events is performed by a plurality of robots.

14. The method of claim 13, wherein at least one robot has a robot arm, the robot arm including a laser touch sensor and a wire touch sensor.

15. The method of claim 3, wherein the plurality of touch-sensing events comprises a touch-sensing schedule.

16. The method of claim 15, wherein the touch-sensing schedule includes a wire touch-sensing event.

17. The method of claim 16, wherein the wire touch-sensing event is switched with the laser touch-sensing event.

18. The method of claim 3, further comprising a member selected from the group consisting of: switching a plurality of laser touch-sensing events to a plurality of wire touch-sensing events; switching a plurality of wire touch-sensing events to a plurality of laser touch-sensing events; and a combination thereof.

19. The method of claim 1, wherein touch-sensing the workpiece includes using a leader robot and the method further comprises providing the updated user frame to a follower robot.

20. The method of claim 19, wherein the leader robot has a robot arm, the robot arm including a laser touch sensor and a wire touch sensor.

21. The method of claim 1, wherein the updated user frame is relative to the leader frame that is provided to at least one robot controller, the at least one robot controller applying the updated user frame.

22. A method for touch-sensing to provide an updated user frame, the method comprising:

providing a user frame;

touch-sensing a workpiece using a robot having a robot arm, the robot arm including a laser touch sensor and a wire touch sensor, the touch-sensing including performing a touch-sensing schedule, the touch-sensing schedule including one of a laser touch-sensing event and a wire touch-sensing event;

switching the one of the laser touch-sensing event and the wire touch-sensing event to the other of the laser touch-sensing event and the wire touch-sensing event while performing the touch-sensing schedule;

determining an offset of the workpiece relative to the user frame based on the touch-sensing of the workpiece; and applying the offset to the user frame to provide the updated user frame.

23. The method of claim 22, wherein the updated user frame is relative to the leader frame that is provided to at least one robot controller, the at least one robot controller applying the updated user frame.

24. A method for touch-sensing to provide an updated user frame, the method comprising:

providing a user frame;

touch-sensing a workpiece, the touch-sensing including a laser touch-sensing event, where touch-sensing the workpiece includes using a leader robot and the method further comprises providing the updated user frame to a follower robot;

determining an offset of the workpiece relative to the user frame based on the touch-sensing of the workpiece; and applying the offset to the user frame to provide the updated user frame.

* * * * *